US012766905B2

(12) United States Patent
Soltermann et al.

(10) Patent No.: US 12,766,905 B2
(45) Date of Patent: Oct. 20, 2026

(54) ADJUSTMENT MECHANISM COMPRISING A LINEAR ACTUATOR, VEHICLE AND METHOD FOR OPERATING A VEHICLE

(71) Applicant: Schaeffler Technologies AG & Co. KG, Herzogenaurach (DE)

(72) Inventors: Marcel Soltermann, Sankt Pantaleon (CH); Roy Schreffler, Bethlehem, PA (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/059,474

(22) Filed: Feb. 21, 2025

(65) Prior Publication Data

US 2025/0269694 A1 Aug. 28, 2025

(30) Foreign Application Priority Data

Feb. 27, 2024 (DE) ......................... 102024105390.9

(51) Int. Cl.

*A01D 34/00* (2006.01)
*B60G 17/015* (2006.01)
*F16D 28/00* (2006.01)
*A01D 101/00* (2006.01)

(52) U.S. Cl.

CPC ........... *B60G 17/015* (2013.01); *A01D 34/00* (2013.01); *F16D 28/00* (2013.01); *A01D 2101/00* (2013.01); *B60G 2202/42* (2013.01); *B60G 2300/084* (2013.01); *B60G 2500/30* (2013.01)

(58) Field of Classification Search

CPC ............................ B60G 17/0523; F16D 28/00
See application file for complete search history.

(56) References Cited

U.S. PATENT DOCUMENTS

| | | | | | |
|---|---|---|---|---|---|
| 4,760,686 | A * | 8/1988 | Samejima | A01D 34/74 | 56/15.8 |
| 5,123,234 | A * | 6/1992 | Harada | A01D 34/6806 | 56/10.2 E |
| 5,346,045 | A * | 9/1994 | Bennett | G09B 9/12 | 74/89.37 |
| 5,351,467 | A * | 10/1994 | Trefz | A01D 34/74 | 56/16.3 |
| 6,082,084 | A * | 7/2000 | Reimers | B60L 1/003 | 56/10.8 |

(Continued)

FOREIGN PATENT DOCUMENTS

| | | | | |
|---|---|---|---|---|
| CN | 111887001 A | | 11/2020 | |
| CN | 111887001 B | * | 4/2022 | A01D 34/28 |

(Continued)

*Primary Examiner* — Nicole T Verley
(74) *Attorney, Agent, or Firm* — Volpe Koenig

(57) ABSTRACT

An adjustment mechanism, in particular for a vehicle, for example a lawn mower, comprises a linear actuator, which has a motor, a transmission arrangement and a displaceable output element, and a manually operable actuation mechanism, wherein there is a coupling element which is displaceable relative to the output element, which represents both a component of the linear actuator and a component of the manual actuation mechanism and which, in a mechanical mode, permanently rests against a stop of the output element, whereas, in a manual mode, it can be lifted off from the stop by means of the actuation mechanism.

8 Claims, 2 Drawing Sheets

(56) References Cited

U.S. PATENT DOCUMENTS

| | | | | |
|---|---|---|---|---|
| 7,329,199 | B2 * | 2/2008 | Blendea | H02K 7/116<br>74/89.31 |
| 8,756,903 | B2 * | 6/2014 | Walden | A01D 34/662<br>56/15.8 |
| 11,006,574 | B1 * | 5/2021 | Nichols | A01D 34/74 |
| 12,571,458 | B2 * | 3/2026 | Lin | F16H 25/20 |
| 2008/0256918 | A1 * | 10/2008 | Kubinski | A01D 34/74<br>56/17.1 |
| 2012/0222395 | A1 | 9/2012 | Grewe et al. | |
| 2012/0240696 | A1 * | 9/2012 | Bastholm | A47C 20/041<br>74/89.38 |
| 2020/0170186 | A1 | 6/2020 | Curtis | |

FOREIGN PATENT DOCUMENTS

| | | | | | |
|---|---|---|---|---|---|
| DE | 102021119937 | A1 | | 7/2021 | |
| DE | 102021119937 | B4 | * | 12/2023 | F16H 25/2021 |
| EP | 551197 | A1 | * | 7/1993 | |
| EP | 2869691 | B1 | | 5/2015 | |
| WO | WO-03055359 | A1 | * | 7/2003 | A47C 20/041 |
| WO | WO-2006039931 | A1 | * | 4/2006 | F16D 11/14 |
| WO | 2024197128 | A1 | | 9/2024 | |

* cited by examiner

ADJUSTMENT MECHANISM COMPRISING A LINEAR ACTUATOR, VEHICLE AND METHOD FOR OPERATING A VEHICLE

CROSS-REFERENCE TO RELATED APPLICATIONS

This application claims priority from German Patent Application No. 10 2024 105 390.9, filed Feb. 27, 2024, which is incorporated herein by reference as if fully set forth.

TECHNICAL FIELD

The disclosure relates to an adjustment mechanism which comprises a linear actuator, in particular with an electromotive drive. Furthermore, the disclosure relates to a vehicle having such an adjustment mechanism and a method for operating a vehicle which is equipped with such an adjustment mechanism.

BACKGROUND

US 2020/0170186 A1 discloses a self-propelled working device, which may be a robotic lawn mower. A mowing device is height-adjustable in relation to a chassis of the working device. The height adjustment of the device according to US 2020/0170186 A1 comprises a ball screw drive.

Another robotic lawn mower described in EP 2 869 691 B1 comprises a motor mount which provides structural support to a cutting motor at an adjustable height relative to the chassis of the robotic lawn mower. A height adjustment arrangement provided for this purpose comprises a preloading element, a screw engagement nut and a height adjustment screw.

The object of DE 10 2021 119 937 A1 is a linear actuator having a cushioning system. The device according to DE 10 2021 119 937 A1 comprises a spring-elastic arrangement which strikes two stop surfaces under preload. By means of a relative displacement between two structural components, which are to be attributed to the device according to DE 10 2021 119 937 A1, it should be possible to lift the spring-elastic arrangement from one of the stop surfaces.

SUMMARY

The object of the disclosure to specify further developed possibilities for operating adjustment mechanisms, which are used for example in vehicles, compared to the prior art. The aim here is to achieve a particularly favorable relationship between the equipment costs and the variety of adjustment options.

This object is achieved according to the disclosure by an adjustment mechanism having according to the present disclosure. The object is also achieved by a vehicle according to the present disclosure and a method for operating a vehicle designed according to the present disclosure. The embodiments and advantages of the disclosure explained below in connection with the operating method also apply mutatis mutandis to the adjustment mechanism and to the vehicle equipped therewith, in particular in the form of a working device, for example a lawn mower, and vice versa.

The adjustment mechanism according to the application comprises a linear actuator, which has a motor, in particular in the form of an electric motor, a single- or multi-stage transmission arrangement, and a displaceable output element. Furthermore, a manually operable actuation mechanism is to be assigned to the adjustment mechanism, wherein there is a coupling element which is displaceable relative to the above-mentioned output element, which represents both a component of the linear actuator and a component of the manual actuation mechanism and which, in a mechanical mode, permanently rests against a stop of the output element. In contrast, in a manual mode, the coupling element can be lifted off the stop of the output element by means of the actuation mechanism.

As far as switching between the different operating modes is concerned, i.e., the machine mode, in particular the electromechanical adjustment mode, on the one hand, and the manual adjustment mode on the other hand, there is, for example, a control element which must be operated to switch between the different modes. There are also embodiments in which a control element intended for manual mode, for example a hand lever or a pedal, can be used spontaneously without first switching to manual adjustment mode.

The adjustment mechanism comprises, for example, a screw drive, in particular in the form of a ball screw drive. In this context, reference is made to DE 10 2010 034 488 A1 as an example. In general, either the threaded spindle or the spindle nut of the screw drive can act as the output element, while the other element represents a rotatable drive element. If the screw drive is a planetary roller gear system, a planetary carrier can also be used as a drive element.

Optionally, a reduction gear, for example in the form of a continuously variable transmission, i.e., a chain or belt drive, can be installed upstream of the screw drive. In the case of a coaxial arrangement of a screw drive intended for converting a rotation into a linear movement and a reduction gear connected upstream of the screw drive, which is designed as a rotary-rotary gear mechanism, the reduction gear is, for example, a planetary gear mechanism or a strain wave gear mechanism.

Regardless of the type of transmission arrangement, which comprises a screw drive and is used in the mechanical mode of the adjustment mechanism, i.e., converts a rotation into a linear travel movement, an output element of the screw drive is coupled to an operating element intended for use in manual mode. The mechanism used for coupling can, for example, comprise a coupling rod and/or a traction device. In all cases, it is sufficient if the linear actuator is designed for transmitting a force to the coupling element in exactly one axial direction.

According to the present disclosure, the vehicle according to the application can in particular be designed as a lawn mower. In any case, the vehicle comprises an adjustment mechanism according to the present disclosure. In particular, there is an electromechanical height adjustment, which also has a manual adjustment mode, i.e., one that does not require electrical energy. With an operating element designed as a hand lever or pedal, the height adjustment of the vehicle can be used intuitively at any time.

In general, the height setting, particularly in the case of a self-propelled working device, can affect the entire vehicle structure or only an apparatus attached to the chassis of the vehicle.

In many applications, it is sufficient if the electromechanical height adjustment is designed for adjustment in exactly one direction, in particular for lifting a component of the vehicle. Depending on the design of the actuator intended for adjustment and the elements interacting with the actuator, the actuator can, for example, be designed exclusively to generate a tensile force or exclusively to generate a compressive force.

Adjustment in the opposite direction can be achieved, for example, by gravity. The same applies to the manual height adjustment. In this case too, it may be sufficient if an operating part, for example in the form of a pedal or a hand lever, is present which is to be actuated for adjustment in a certain direction, in particular for lifting, whereas the opposite adjustment movement, in particular the lowering of a component of the vehicle, can be carried out by gravity. Deviating from this, both in the case of electromechanical adjustment and in the case of manual adjustment, an active adjustment option in both adjustment directions can be provided.

In principle, the vehicle according to the application can either be a vehicle on or in which an operator sits or stands, or a driverless vehicle. In the case of a lawn mower, the height adjustment may be intended in particular for adjusting the height of a mower.

If the vehicle is a lawn mower, the height setting of a mower can be varied mechanically, namely by means of the linear actuator, within a predetermined adjustment range by means of the adjustment mechanism. If the mower is not yet raised to its maximum position, the height setting of the mower can be changed manually if necessary within the remaining adjustment range up to the maximum raised position of the mower.

In general, the method for operating a vehicle having a height-adjustable component is characterized in that the height adjustment of the component in question is carried out electromechanically in a first mode and manually in a second mode.

According to the present disclosure, with the aid of the adjustment mechanism, the height setting of a mower is varied mechanically, namely by the linear actuator, within a predetermined adjustment range. If the mower is not raised to its maximum position, the height setting of the mower can be changed manually as required within the remaining adjustment range up to the maximum raised position of the mower.

BRIEF DESCRIPTION OF THE DRAWINGS

Exemplary embodiments of the disclosure are explained in more detail below by means of drawings. The figures show the following in an, in parts, roughly schematized manner.

DETAILED DESCRIPTION

Figure 1:
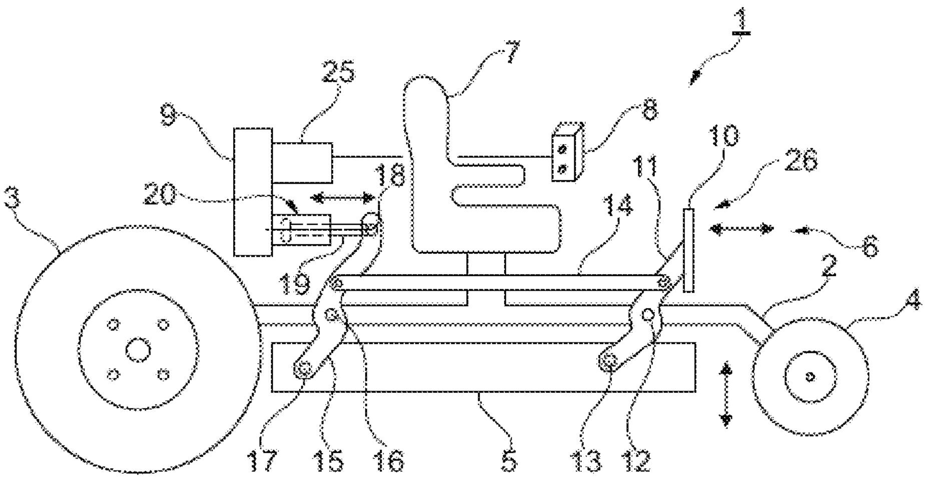
FIG. 1 shows a vehicle, namely a lawn mower designed as a ride-on mower, including an adjustment mechanism for varying the height setting of a mower, in a schematic side view.

Unless otherwise stated, the following explanations relate to all the exemplary embodiments. Parts that correspond to each other or have basically the same effect are denoted with the same reference signs in all the figures.

A vehicle identified overall with the reference number 1 is a ride-on mower, the chassis of which is designated 2 and the wheels of which are designated 3, 4. A mower 5 located under the chassis 2 can be adjusted either electromechanically or manually by means of a height adjustment 6, which will be discussed in more detail below.

In addition to a seat 7 fastened to the chassis 2, a control unit 8 is arranged, which is linked to an actuator 9, namely a linear actuator, which is provided for the motor actuation of the height adjustment 6, i.e., the adjustment mechanism. The adjustment of the mower 5 by means of the actuator 9 is referred to as the first adjustment mode.

In addition to the first adjustment mode, there is a second, manual adjustment mode, which does not require electrical energy. For this purpose, a pedal 10 is placed in front of the seat 7. A manually operated lever can also be used instead of the pedal 10. This applies in particular to embodiments not shown in which the vehicle 1 is designed as a self-propelled device without a driver's seat. The pedal 10 is attached to a lever 11, which is referred to without restriction of generality as the front lever. A center pivot point 12 of the lever 10 is located on the chassis 2, while a lower pivot point 13 is located on the mower 5. Furthermore, the lever 11 is connected in an articulated manner to a rod 14 in the section between the center pivot point 12 and the pedal 10, which in the present case is located in a horizontal orientation above the chassis 2.

The rear end of the rod 14, the left end in the arrangement according to FIG. 1, is coupled in an articulated manner to a second, rear lever 15. Overall, the rear lever 15 has a basic shape comparable to the front lever 11. In the case of the rear lever 15, a center pivot point is designated 16 and a lower pivot point is designated 17. At an upper pivot point 18 of the lever 15, an articulated connection to a push rod 19 is established, which in the embodiment according to FIGS. 1 and 2 is a coupling element of the adjustment mechanism 6.

The push rod 19 is part of a screw drive, designated overall with 20, in this case a ball screw drive, of the actuator 9. In the present cases, the ball screw drive 20 is designed as a non-self-locking screw drive, i.e., as a screw drive which can also be operated from the output side. Alternatively, a self-locking design of the screw drive 20 can be considered.

Figure 3:
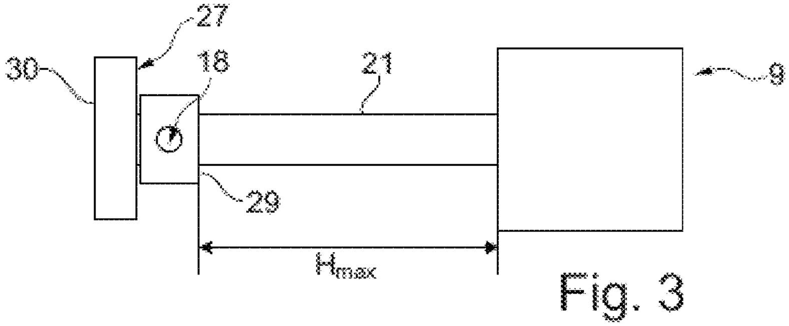
FIG. 3 shows a second embodiment of an adjustment mechanism for a vehicle comprising a linear actuator in a first setting, namely with the threaded spindle of the linear actuator extended to its maximum and the coupling element, which is also manually displaceable, resting against a stop of the threaded spindle.
Figure 4:
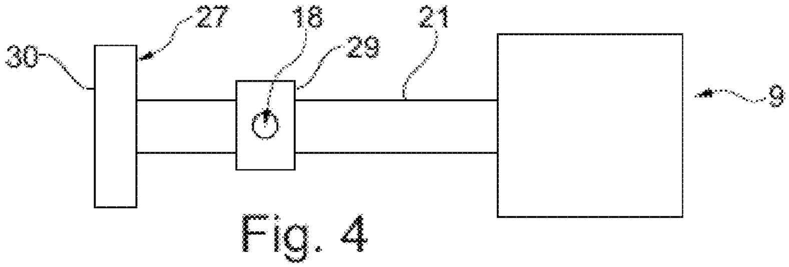
FIG. 4 shows the adjustment mechanism according to FIG. 3, wherein here too the threaded spindle is extended to its maximum, but the coupling element is lifted from the stop.
Figure 5:
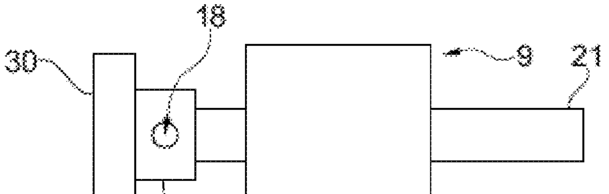
FIG. 5 shows the adjustment mechanism according to FIG. 3 with partially retracted threaded spindle, wherein the coupling element rests against the stop.

A threaded spindle of the ball screw drive 20 is designated 21 in each embodiment. In the case of FIGS. 1 and 2, a corresponding spindle nut 22 is guided in a non-rotatable manner as the output element of the ball screw drive 20. In the exemplary embodiments according to FIGS. 3 and 5, the threaded spindle 21 represents the output element of the ball screw drive 20. In both cases, the output element 21, 22 provides a stop 27 for a coupling element 19, 29, wherein in the case of FIGS. 1 and 2 is in the form of a hollow push rod 19 and in the case of FIGS. 3 to 5 is in the form of a sliding sleeve 29. In any case, it is possible to act on the coupling element 19, 29 by means of the pedal 10.

Figure 2:
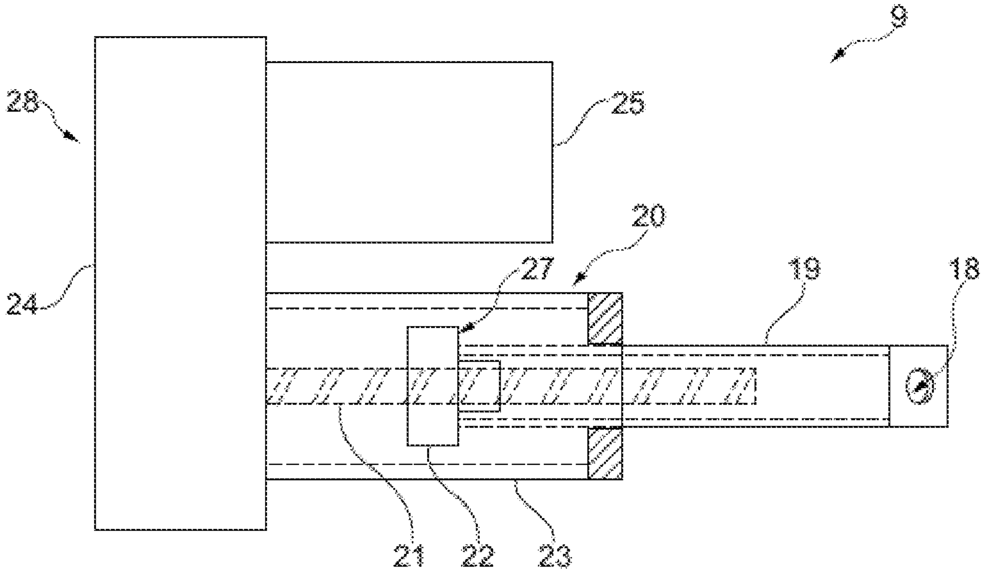
FIG. 2 shows an electromechanical actuator of the vehicle according to FIG. 1, intended for the height adjustment of the mower.

The push rod 19 is displaceably mounted in a housing part 23 of the actuator 9 as shown in FIG. 2. In an analogous manner, in the variant according to FIGS. 3 to 5, the sliding sleeve 29 can be displaced in a rotationally secured manner.

The housing part 23 is firmly connected to a housing of a reduction gear 24, which in the present case is designed as a continuously variable transmission, namely, a belt drive. The arrangement of the reduction gear 24 and the ball screw drive 20 is collectively referred to as the transmission arrangement 28. On the input side of the reduction gear 24, this is connected to the shaft of an electric motor 25, which is also a component of the actuator 9.

In order to raise the mower 5, in the case of FIGS. 1 and 2 in the electromechanical adjustment mode, the push rod 19 must be extended from the housing part 23. This inevitably means that the front lever 11 is also adjusted, which is irrelevant in this case. In order to raise the mower 5 by muscle power, the driver steps on the pedal 10, whereby both levers 11, 15 are pivoted clockwise, relative to the arrangement according to FIG. 1. Optionally, the control unit 8 displays the current setting of the mower 5. A lowering of the mower 5, which is accompanied by a retraction of the push rod 19 into the housing part 23, can be assisted or caused by gravity.

The exemplary embodiment according to FIGS. 3 to 5 differs from the embodiment according to FIGS. 1 and 2 in that the coupling element, which is present here in the form of the sliding sleeve 29, is not loaded by the actuator 9 with a compressive force, but rather with a tensile force. The stop 27, on which the coupling element 29 can be supported, is provided by an end piece 30 of the threaded spindle 21. The maximum stroke of the threaded spindle 21 is designated with $H_{max}$. In the setting shown in FIG. 3, the mower 5 (not shown here) is lowered to its maximum position. While maintaining the setting of the actuator 9, the sliding sleeve 29 can be lifted from the stop 27 by actuating the pedal 10, whereby the mower 5 is raised manually. In the setting outlined in FIG. 4, barely half of the maximum stroke $H_{max}$ is used. Here, the coupling element 29 is loaded with a force, while the threaded spindle 21 is not subjected to any compressive or tensile force. As soon as the pedal 10 is released, the mower 5 is lowered again until the setting shown in FIG. 3 is reached again.

The setting of the linear actuator 9 shown in FIG. 5 also assumes that the mower 5 was previously completely lowered. The transition between the setting according to FIG. 3 and the setting according to FIG. 5 is possible purely by motor, i.e., with the sliding sleeve 29 permanently in contact with the stop 27. To a small extent, starting from the setting according to FIG. 5, an additional manual displacement of the sliding sleeve 29 and thus a lifting of the mower 5 is possible until the upper stop of the mower 5 is reached, in this case accompanied by a stop of the sliding sleeve 29 on the left side of the housing of the linear actuator 9.

Figure 6:
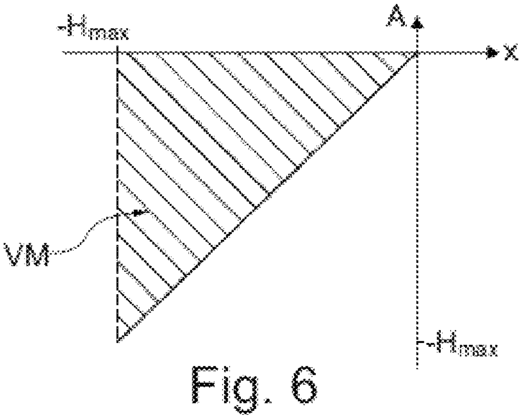
FIG. 6 shows a diagram showing the relationship between mechanical and manual actuation options of the adjustment mechanism according to FIGS. 3 to 5.

The dependency between the manual adjustment option and the setting of the threaded spindle 21 is also evident from the diagram in FIG. 6. Here, the threaded spindle 21 is adjustable along the x-axis. The deflection of the sliding sleeve 29, i.e., the coupling element, which is clearly related to the height setting of the mower 5, is designated by A. VM indicates the adjustment range, depending on the setting of the threaded spindle 21, in which manual lifting of the mower 5 is possible. In order to cushion the lowering movement of the mower 5 after a manual lifting, cushioning elements (not shown) can be built into the manual actuation mechanism, designated overall by 26.

LIST OF REFERENCE SYMBOLS

1 Vehicle
2 Chassis
3 Wheel
4 Wheel
5 Mower
6 Height adjustment, adjustment mechanism
7 Seat
8 Control unit
9 Linear actuator
10 Pedal
11 Lever, front
12 Center pivot point
13 Lower pivot point
14 Rod
15 Lever, rear
16 Center pivot point
17 Lower pivot point
18 Upper pivot point
19 Push rod, coupling element
20 Ball screw drive
21 Threaded spindle
22 Spindle nut
23 Housing part
24 Reduction gear
25 Motor, electric motor
26 Actuation mechanism, manual
27 Stop
28 Transmission arrangement
29 Sliding sleeve, coupling element
30 End piece
A Deflection
$H_{max}$ Maximum stroke
VM Manual adjustment range
x Adjustment path of the output element

The invention claimed is:

1. An adjustment mechanism comprising: a linear actuator including a motor, a transmission arrangement and a displaceable output element; and a manually operable actuation mechanism; wherein a coupling element is displaceable relative to the output element, which represents both a component of the linear actuator and a component of the manually operable actuation mechanism and which, in a mechanical mode, permanently rests against a stop of the output element, whereas, in a manual mode, the coupling element can be lifted off from the stop by the manually operable actuation mechanism.

2. The adjustment mechanism according to claim 1, wherein the linear actuator comprises a screw drive.

3. The adjustment mechanism according to claim 2, wherein the screw drive includes a ball screw drive.

4. The adjustment mechanism according to claim 2, further comprising a reduction gear in the form of a continuously variable transmission connected upstream of the screw drive.

5. The adjustment mechanism according to claim 2, wherein the screw drive has a spindle nut as an output element.

6. The adjustment mechanism according to claim 2, wherein the screw drive has a threaded spindle as an output element.

7. The adjustment mechanism according to claim 1, wherein the linear actuator is configured to transmit a force to the coupling element in exactly one axial direction.

8. The adjustment mechanism according to claim 1, wherein a pedal is provided for manually displacing the coupling element.

* * * * *